United States Patent

Posner et al.

Patent Number: 5,254,842
Date of Patent: Oct. 19, 1993

[54] SYSTEM FOR PREVENTING UNAUTHORIZED OPERATION OF AN AUTOMOTIVE VEHICLE

[76] Inventors: Edward C. Posner, 1460 Rose Villa St., Pasadena, Calif. 91106; Phillip K. Sotel, 570 Garden La., Pasadena, Calif. 91105; Moshe Becker, 275 S. Grand Oaks, Pasadena, Calif. 91107

[21] Appl. No.: 806,712

[22] Filed: Dec. 11, 1991

Related U.S. Application Data

[63] Continuation-in-part of Ser. No. 553,715, Jul. 16, 1990, abandoned, which is a continuation-in-part of Ser. No. 462,024, Jan. 8, 1990.

[51] Int. Cl.$^5$ .................. B60R 25/04; G06K 7/06
[52] U.S. Cl. .................. 235/382; 235/492; 340/825.31; 307/10.2
[58] Field of Search .................. 235/382, 382.5, 492; 380/26, 33, 4; 340/825.31, 825.32; 307/10.2, 10.3

[56] References Cited

U.S. PATENT DOCUMENTS

| | | | |
|---|---|---|---|
| 4,982,072 | 1/1991 | Takigami | 235/382 |
| 5,006,843 | 4/1991 | Haver | 340/825.31 |
| 5,019,812 | 5/1991 | Göstahagberg et al. | 340/825.31 |
| 5,072,101 | 10/1991 | Ferguson | 235/382 |

FOREIGN PATENT DOCUMENTS 59-95623  6/1984  Japan ................. 235/382

Primary Examiner—Donald T. Hajec
Assistant Examiner—Esther Chin
Attorney, Agent, or Firm—George J. Netter

[57] ABSTRACT

The described system prevents unauthorized operation of an automotive vehicle under the control of a separable engine control module (10) and signal source or memory device (12). A wire scrambler (22) and interface module (24) are interconnected between the engine control module (10) and memory device (12). A key device (20) having a fixed coded signal source (53) on being received within a lock cylinder (26) energizes a crossbar switch matrix (44) in the interface module (24) which effectively provides a correct wiring relationship between the engine control module (10) and the memory device (12). Connector parts (16, 30) are secured together in a manner that would destroy connector contacts if separated.

10 Claims, 2 Drawing Sheets

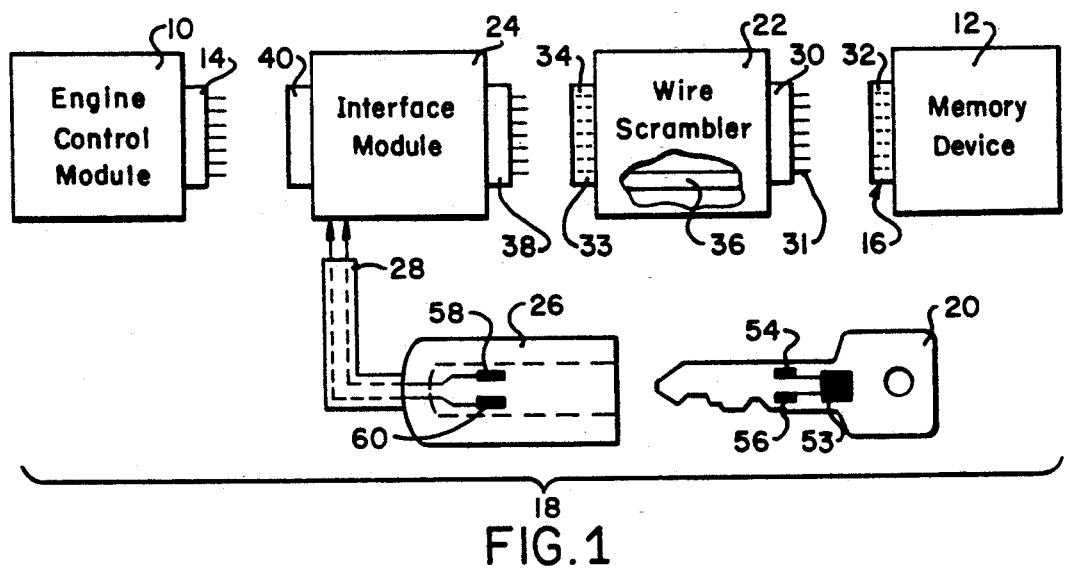
FIG.1
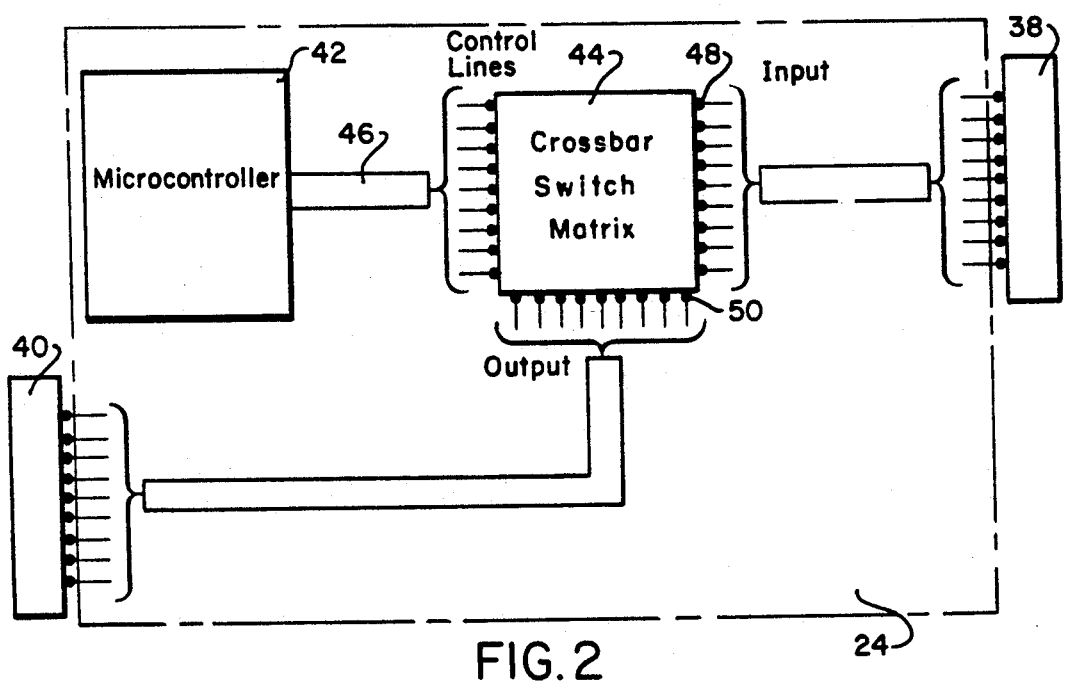
FIG.2
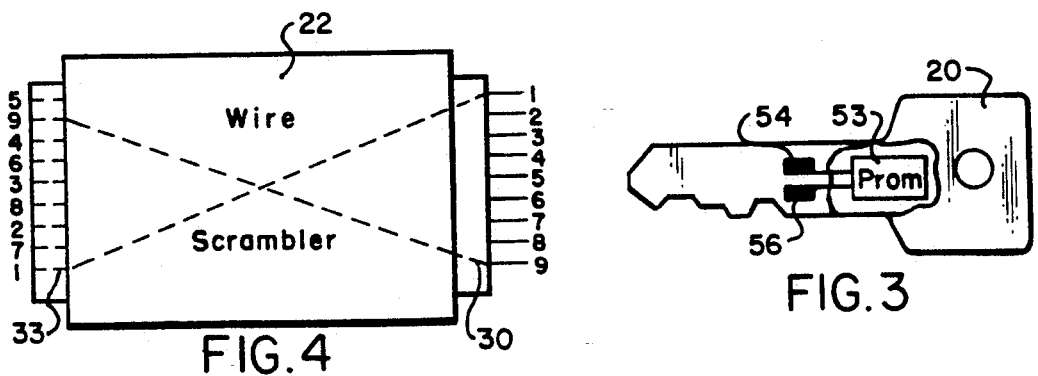
FIG.4
FIG.3

SYSTEM FOR PREVENTING UNAUTHORIZED OPERATION OF AN AUTOMOTIVE VEHICLE

This application is a continuation-in-part of U.S. application Ser. No. 07/553,715 filed Jul. 16, 1990, now abandoned, which application is a continuation-in-part of U.S. application Ser. No. 07/462,024 filed Jan. 8, 1990.

BACKGROUND

1. Field of the Invention

The present invention relates to a system for preventing unauthorized operation of a motor vehicle, and, more particularly, to such a system specifically applicable to preventing operation of an automotive vehicle having its engine under control of a microprocessor.

2. Description of Related Art

It is well known that a large number of automotive vehicles are stolen each year or are taken by unauthorized persons for "joy riding" purposes. Many devices and apparatus have been proposed for preventing such unauthorized use of a vehicle, however, they all have been found not to be fully satisfactory in that they are relatively expensive, complicated to use, not sufficiently reliable, or they are readily circumvented by the would-be thief or joy rider.

Many of the present day automotive vehicles are so constructed as to have many of the engine functions (e.g., ignition, fuel ignition) under the control of a microprocessor. Co-pending U.S. patent application No. 07/553,715, A SYSTEM FOR PROVIDING SECURE ACCESS TO A PROTECTED UNIT, by E. C. Posner and P. K. Sotel, discloses apparatus for securing access to various protected units including an automotive vehicle controlled by a microprocessor. Briefly, the patented system has an optical scanner which reads a prescribed unique optical code on a key device (e.g., ignition key) and on the code being found to coincide with a stored code produces a set of actuation signals. The actuation signals energize a crossbar switch unique for each vehicle which then interconnects a plurality of different functional elements in the vehicle necessary for vehicle operation. Specifically, the crossbar switch when properly energized interconnects the computer with those portions of the motor apparatus which are being controlled by the computer. When attempt is made to operate the vehicle without the correct key device, the signals coming to and from the processor do not make their way to the correct end location because of the scrambled circuit arrangement through the crossbar switch and in this way operation of the vehicle is prevented. The code on the key device is carried by an optical microchip with the reading thereof accomplished by a laser scanning system.

SUMMARY OF THE INVENTION

In these present day automotive vehicles relying upon microprocessor control, a typical major arrangement of the microprocessor and related subparts are that the memory circuits are separate from the processor and typically releasably interconnected via plug and receptacle connector having pin and socket contacts. In other cases, the memory may be located somewhat remote from the processor and interconnection made via a multi-lead cable. In either case for installation of the present invention a primary first step is the separation of the processor from its memory.

Next, a wire scrambler module is interconnected with the memory device via a plug and receptacle connector, for example, such that output connections from the wire scrambler module are scrambled in a known predetermined way with the proper memory locations in the vehicle memory device.

Finally, an interface module is interconnected between the wire scrambler module output and the processor control module for the vehicle engine. The interface module includes a crossbar matrix of the same number of passthrough interconnections as those of the wire scrambler module.

In use of the system of this invention, an internal processor within the interface module receives as part of an energizing input a given code signal from a key device (e.g., ignition key). The key device code is contemplates as being unique for that particular automobile and produces a set of signals which are fed to a crossbar switch within the interface module and rearranges the current paths through this switch. There are enough bits in the code to produce all the permutations of N wires being scrambled, or N!. For example, if $N=5$, $N!=5\times4\times3\times2=120$, and 7 bits will suffice (i.e., $2^7=128$). If the coded information on the key device correlates properly with the scrambled condition of the current pathways through the wire scrambler module, then the information that is passed from the wire scrambler module to the crossbar switch will be once again in the same arrangement as delivered from the memory device to the wire scrambler module resulting in correct information paths between the engine control module and the memory device. When this happens, and only when all of these information paths are correct, the automotive vehicle may be operated.

DESCRIPTION OF THE DRAWING

In the accompanying drawing:

FIG. 1 is a function block diagram of the major elements of the present invention shown in operative relation to an engine control module for an automotive vehicle;

FIG. 2 is a detailed function block diagram of the interface module of the present invention;

FIG. 3 is a side elevational, partially schematic view of a key device for use in this invention;

FIG. 4 is a schematic depiction of a wire scrambler module; and

DESCRIPTION OF A PREFERRED EMBODIMENT

Figure 5:
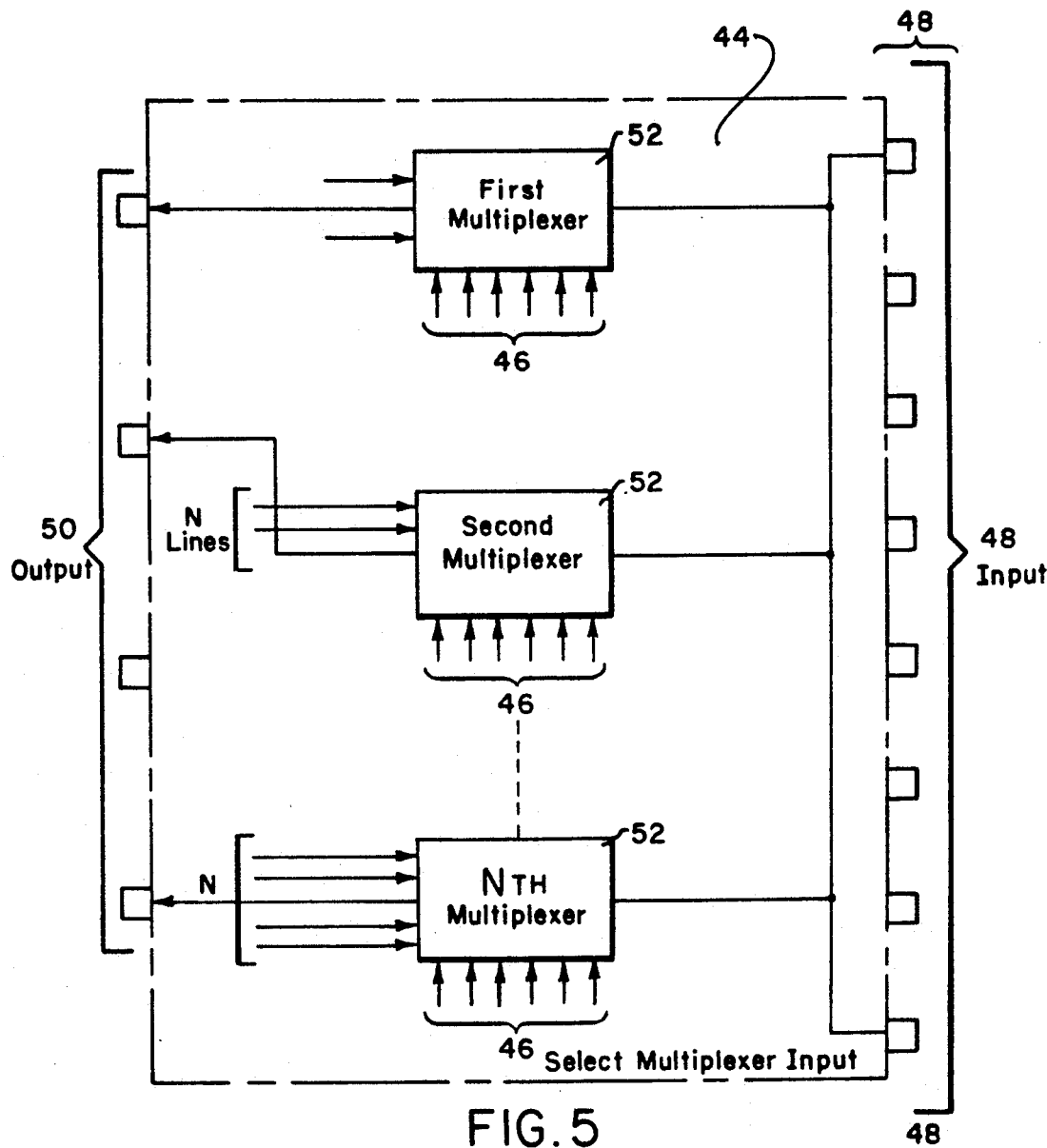
FIG. 5 is a function block depiction of a crossbar switch matrix.

Turning now to the drawing, and particularly FIG. 1, there is shown an engine control module 10 which is used to control certain of the operational functions of many present day automotive vehicles. For example, an engine control module includes a microprocessor and is used to control such things as the engine ignition system and fuel injection timing, among other things. In normal use, the module 10 is interconnected to a data source such as a memory device 12 via a plug 14 and receptacle connector 16. Upon separation of the engine control module plug from the memory device receptacle 16, or upon only partial interconnection between the two, the operation of the vehicle will either be substantially impaired or prevented entirely.

Figure 6:
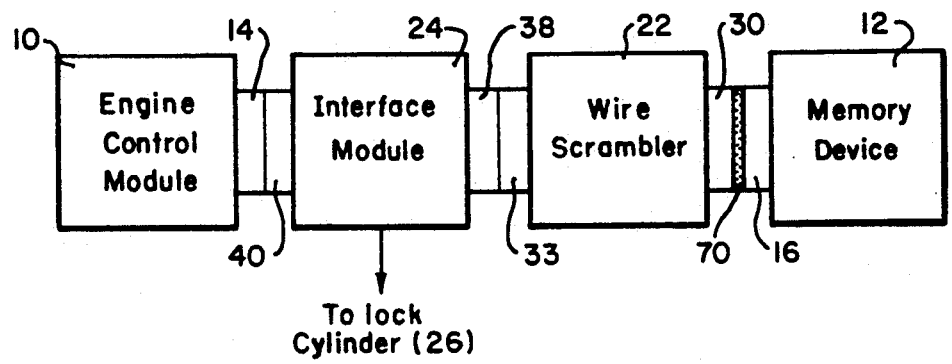
FIG. 6 is a function block diagram of the major elements of the present invention showing various interconnections.

In its most general aspects, the present invention, enumerated generally as 18, on being electrically interconnected between the engine control module 10 and memory device 12 prevents the engine control module from producing satisfactory engine operation unless a properly encoded key device 20 is used. As shown separated in FIG. 1, the invention includes as its major parts a wire scrambler 22, an interface module 24, and the key device 20, the latter interconnecting with the interface module via a lock cylinder 26 and a cable 28. FIG. 6 shows the various parts interconnected.

The wire scrambler 22 has a connector part 30 which can interconnect with the memory device receptacle 16 and has a sufficient number of terminals 31 to match the receptacle terminals 32 on a one-to-one basis. An outlet connector part 33 also has the same number of terminals 34 as those of connector part 30. Internally, the wire scrambler includes a plurality of current conducting leads 36 (e.g., leads laid down on a circuit board), the ends of each lead being interconnected respectively with a terminal 31 and 33, but in a predetermined scrambled manner. That is, it is contemplated that for each automotive vehicle the scrambled interconnection relationship between the connector parts 30 and 33 will be different.

The interface module 24 is a separate unit from the wire scrambler 22 and has a first connector part 38 on its exterior which will mate with the outlet connector part 33 of the wire scrambler and a second connector part 40 for mating with the engine control module 10.

Turning now to FIG. 2, it is seen that the interface module 24 includes a microcontroller 42 and a crossbar switch matrix 44, the latter being energizable by the microcontroller via leads 46 to interconnect the matrix inlet terminals 50 with its inlet terminals 48 in any desired one-for-one relationship. As can be seen best in FIG. 5, for each inlet terminal 48 interconnected with a wire scrambler terminal there is provided a multiplexer 52 making a total of N multiplexers. Each of the inlet terminals 48 is connected to each multiplexer 52 on what may be termed a common outlet side for the multiplexers. Each multiplexer has an outlet 50 and multiplexer selection leads 46 from the microcontroller 42. The number of multiplexer selection leads is enough to identify the input selected to drive the output, for example, 3 if N=8, 4 if N=12.

In a well-known way a multiplexer 52 can be selectively energized by the microcontroller to provide an interconnection of the multiplexer single inlet terminal 48 with any single one of its N outlet terminals 50.

The key device 20, which may be constructed as a conventional ignition key, for example, incorporates a microchip 53 that can be, in effect, a programmable read-only memory (PROM) having two outlet connection terminals 54 and 56. The lock cylinder 26 for receiving the key device therein, in addition to operating in conventional manner (e.g., releasing steering column lock), has internal contacts 58 and 60 for establishing connection of the PROM 53 with the microcontroller through key device terminals 54 and 56 when the key device is positioned within the lock cylinder.

It is a fundamental aspect of this invention that the microchip 53 be provided with a predetermined code which upon being received by the microcontroller 42 selectively energizes the crossbar switch matrix 44 so as to unscramble the terminal connections produced by the wire scrambler 22. That is, in order to successfully operate the vehicle engine a key device having a correct code for the particular wire scrambler must be used. The interface module, on the other hand, may be constructed for operation with any combination of key device and wire scrambler.

In a practical construction of the invention, encoding the permutation of N wires was accomplished by a coding scheme which results in somewhat more bits being used than are actually theoretically necessary, but the code has been found easier to implement. For any particular wire permutation, the code is a concatenation of N binary representations, one for each input wire number to output wire number combination. For example, if N=12, then it can be shown that 4 bits are required to represent the numbers 1-12 in binary form, namely, 1:0001; 2:0010—12:1010. This, in turn, means that 48 bits are needed to describe the 12! permutations of 12 wires. For very large values of N, the coding scheme comes very close in ratio to the theoretical minimum number of bits.

Illustrative of an example, suppose the following input to output wire permutations are desired: 1-7, 2-11, 3-9, 4-12, 5-1, 6-5, 7-10, 8-2, 9-4, 10-3, 11-8, 12-6. These would be represented by the 48 bits .0111. 1011. 1001. 1100. 0001. 0101. 1010. 0010. 0100. 0011. 1000. 0110. The output address of a given input wire is then merely the 4 bits in the position corresponding to the input wire. As a further illustration of the coded technique, the output address of the number 7 input wire is 1010, or the number 10, so that input wire 7 goes to output wire or terminal 10. This is true because the four bits 1010 occupy bit positions 25-28 of the codeword referenced above.

The 48 bit count in the code word does not include bits that may optionally be present for read error correction or detection, as well as a start sequence for synchronization. Error-correction may be used in the present invention and 8 bits are added to the code word for this purpose. By this addition, single "symbol" errors (i.e., an error or combination of errors in one of the length-4 code words corresponding to an output wire or terminal address) can be corrected using standard known algorithms for Reed-Solomon codes. More particularly, the present invention uses a shortened Reed-Solomon code over the 16 symbol alphabet, of length 14 shortened from 15 symbols. Word length in this case is 4×14=56 bits, which is also 48+8 bits. There are no synchronization bits.

Two symbols, or 8 bits, are appended to the code word for correcting a single symbol error, if any occur. The encoding scheme encodes the 12 symbols corresponding to a specific permutation of the 12 wires (or terminals) preceded by the 0000 symbol, for 13 encoded symbols. The two check symbols are appended to the code on the key device.

The 0000 symbol is not included on the key device, so that the actual code includes 56 bits, plus any bits that may be needed to control special or particular functions, and, of course, these may be error-protected as well.

The decoding performed in the interface module appends the 0000 (which is not on the key device) and decodes using the well-known algorithm for single error-correcting Reed-Solomon codes. The corrected 48 bits are then used to generate the corresponding wire or terminal permutation. Appending still further check bits would allow multiple errors in reading to be corrected, at the expense of a more complex decoding algorithm.

For full security, the interface module should be fixedly secured to the engine control module, or, alternatively, the wire scrambler may be secured to the memory device. Still further, both may be secured at the same time. A preferred manner of securing the various parts of the invention to the engine control unit and memory would be to utilize an adhesive 70 on the connector parts which would destroy the various terminals if separation were forced, as shown in FIG. 6.

To install the invention in an automotive vehicle, the first step would be to separate the engine control module 10 from its memory device 12 and interconnect an interface module 24 and wire scrambler 22 therebetween as shown in FIG. 1. Next, a lock cylinder 26 and a key device 20 (the latter compatible with the particular wire scrambler used) is substituted for the existing lock cylinder and the cable 28 is interconnected with the interface module. The invention is now in place and ready for use.

Although the present invention has been described in connection with a preferred embodiment, it is understood that those skilled in the appertaining arts may effect modifications that come within the scope of the specification and within the ambit of the appended claims.

What is claimed is:

1. In an automotive vehicle having the vehicle engine controlled by an engine control module releasably interconnected with a data source via a plurality of terminals, a system for preventing unauthorized operation of the vehicle interconnected between the engine control module and the data source, comprising:

means interconnected with the data source terminals having outlet terminals in predetermined one-for-one scrambled relation to the data source terminals;

an interface module interconnected with said means and the engine control module responsive to coded signals for providing an unscrambled one-for-one interconnection from the engine control module to the data source;

a key device;

coded signal means carried by said key device; and means interconnecting the coded signal means with the interface module.

2. A system as in claim 1, in which the coded signal means includes a microchip.

3. A system as in claim 2, in which the coded signal means includes a PROM.

4. A system as in claim 1, in which the interconnecting means includes a lock cylinder with internal contacts, said key device having contacts interconnected with the coded signal means and the internal contacts when the key device is received within the lock cylinder, and a cable interconnecting the lock cylinder internal contacts and the interface module.

5. A system as in claim 1, in which the means interconnected with the data source includes inlet terminals for interconnecting with the data source terminals, an identical plurality of electric current conductors interconnecting the inlet terminals with the outlet terminals in predetermined scrambled relation.

6. A system as in claim 1, in which the interface module includes a microcontroller and a selectively actuatable crossbar switch matrix.

7. A system as in claim 6, in which the crossbar switch matrix includes a plurality of multiplexers, one for each data source terminal; each multiplexer having a single inlet terminal interconnected with the means interconnected with the data source terminals, an output interconnected with the engine control module, and multiplexer selection leads interconnected to receive selected signals from the microcontroller for unscrambling the crossbar switch matrix current paths.

8. A system as in claim 1, in which the means interconnected with the data source includes inlet terminals that releasably interconnect with the data source terminals, and a quantity of a material securing the said terminals to one another to such an extent that attempted separation would damage at least one of the said terminals making it inoperative.

9. A system as in claim 1, in which the interface module includes outlet terminals which releasably interconnect with engine control module terminals, and a quantity of a material secures the said terminals to one another such that separation cannot be achieved without making at least one of the engine control module terminals inoperative.

10. A system as in claim 1, in which the data source is a memory device.

* * * * *